United States Patent [19]

Hekal

[11] 4,201,664
[45] May 6, 1980

[54] ULTRAFILTRATION OR REVERSE OSMOSIS TREATMENT OF EMULSIFIED OIL METAL WORKING COOLANTS

[75] Inventor: Ihab M. Hekal, Downers Grove, Ill.

[73] Assignee: The Continental Group, Inc., New York, N.Y.

[21] Appl. No.: 617,348

[22] Filed: Sep. 29, 1975

[51] Int. Cl.² .............................................. B01D 13/00
[52] U.S. Cl. ................................ 210/23 H; 210/23 F; 134/10
[58] Field of Search .......... 210/23, 22, 500 M, 321 R; 134/10

[56] References Cited

U.S. PATENT DOCUMENTS

| | | | |
|---|---|---|---|
| 3,228,876 | 1/1966 | Mahon | 210/22 |
| 3,615,024 | 10/1971 | Michaels | 210/500 M |
| 3,749,657 | 7/1973 | Bras et al. | 210/23 UX |
| 3,795,609 | 3/1974 | Hill et al. | 210/23 H |
| 3,847,804 | 11/1974 | DelPico | 210/23 U |
| 3,919,075 | 11/1975 | Parc et al. | 210/23 UX |
| 3,973,987 | 8/1976 | Hewitt et al. | 210/23 H X |
| 3,977,967 | 8/1976 | Trulson et al. | 210/500 M X |

OTHER PUBLICATIONS

Goldsmith et al., "Soluble Oil Waste Treatment Using Ultrafiltration", presented at 46th WHF.WPCF, Cleveland, 33 pp., Oct. 4, 1973.

*Primary Examiner*—Charles N. Hart
*Assistant Examiner*—David R. Sadowski
*Attorney, Agent, or Firm*—Paul Shapiro; Joseph E. Kerwin; William A. Dittmann

[57] ABSTRACT

A portion of the oil-in-water emulsion used as a lubricant/coolant in the shaping of metal articles such as containers is subjected to a reverse osmosis or ultrafiltration process to concentrate the oil portion and separate a water permeate. The oil concentrate is reincorporated in the remaining portion of the coolant and the permeate is used as rinse water to remove oil residues retained on the article from the metal shaping operation. The coolant is then reconstituted with the oil residue rinsed from the article.

7 Claims, 1 Drawing Figure

U.S. Patent
May 6, 1980
4,201,664
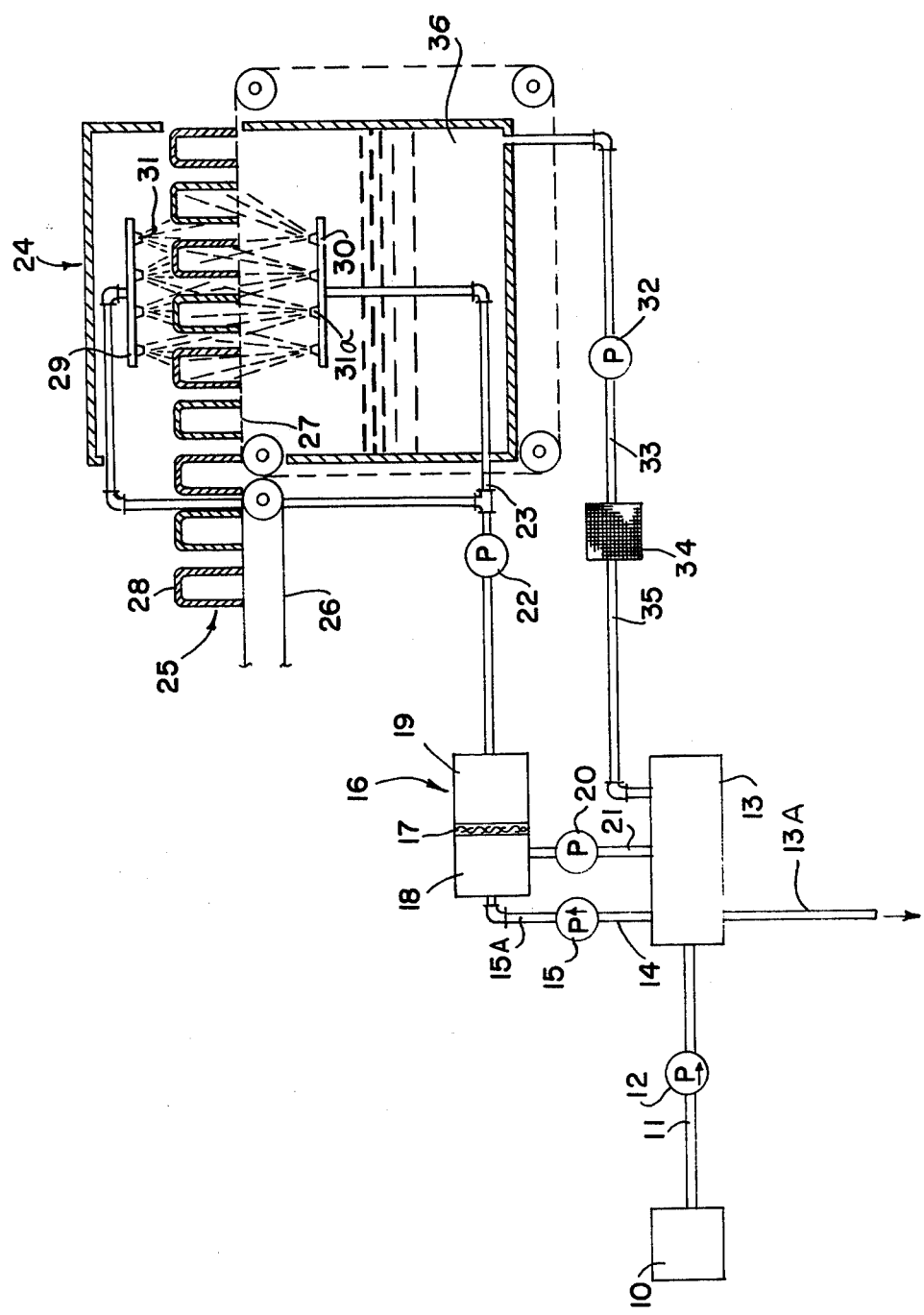

ULTRAFILTRATION OR REVERSE OSMOSIS TREATMENT OF EMULSIFIED OIL METAL WORKING COOLANTS

BACKGROUND OF THE INVENTION

1. Field of the Invention

The invention relates to the water rinsing of metal articles, such as containers to remove therefrom oil residues retained from metal shaping operations and more particularly to the use of ultrafiltration or reverse osmosis membranes in the preparation of the rinse water used in the article rinsing operation.

2. The Prior Art

A large proportion of metal cans presently used for the packaging of carbonated beverages are fabricated in two-piece form wherein the can body and one can end are integral and a separate end is later attached to the open end of the body to seal the container.

One method by which two-piece cans are manufactured is the so-called drawn and wall iron process wherein a shell cup is produced from sheet metal by drawing and is then redrawn to a cup of longer length and smaller diameter and the redrawn cup is then wall ironed to produce the required body length and wall thickness.

The container body after wall-ironing contains trace amounts of the oil used to lubricate and cool the shaping dies during the wall ironing operation.

The coolant is generally an oil-in-water emulsion comprised primarily of about 1 to about 20% by weight of a lubricant oil and about 0.1 to about 20% by weight of an emulsifying agent or surfactant which promotes the emulsification of the oil and water diluent to an emulsion of high stability; i.e., the oil cannot be separated from the water diluent.

The oil residue adhered to the container body must be removed in order that the protective coatings and enamels subsequently applied to the container bodies will adhere properly. To remove oil and other foreign material which adheres to the drawn container, the container body is rinsed with water sprays. After the water rinsing the container is further washed and chemically treated to prepare the container for the coating and decorating operations which follow.

The rinse water, after it is used to effect the removal of the oil residue from the container body, represents a waste disposal problem since the oil and other materials suspended in this rinse water are undesirable in drain lines and are either unlawful under community sewage codes or cause stream pollution or other disposal problems.

Among the methods known to the art for removing and recovering organic resinous materials suspended in water is ultrafiltration and reverse osmosis. In ultrafiltration or reverse osmosis a water suspension containing organic resin solids is fed under pressure to the "upstream" or feed zone of an ultrafiltration or reverse osmosis unit equipped with a semipermeable membrane mounted on a porous support housed in a pressure resistant structure and adapted to separate high molecular weight organic compounds from aqueous media. The water portion of the suspension passes through the semipermeable membrane and the organic resin is retained whereby a concentrated suspension of organic resin solids is formed in the feed zone side of the membrane. This concentrated solids suspension or concentrate is then removed from the feed zone and cycled for reuse. The water separated from the suspension, referred to as "permeate" having the solid organic resin removed therefrom can be readily disposed of without ecological problems.

The removal of organic resin solids by ultrafiltration or reverse osmosis from the aqueous effluent of coating processes is well known to the art. For example, U.S. Pat. Nos. 3,538,901 and 3,749,657 teach a method of removing organic resin solids from electrodeposition rinse water wherein the rinse water is subjected to ultrafiltration or reverse osmosis processes. The concentrated resin suspension obtained by ultrafiltration or reverse osmosis is returned to the electrodeposition bath for reuse and the permeate may be used as rinse water.

One drawback to using ultrafiltration or reverse osmosis processes for removal of organic solids from the rinse water used in the washing of drawn and wall ironed containers is that the oil which is separated from the effluent is not reusable in the can fabricating process which not only increases the cost of the process but presents a disposal problem.

SUMMARY OF THE INVENTION

In accordance with the present invention there is provided a method whereby the waste disposal problem associated with rinse water used in the washing of oil residues from metal articles, such as containers, is substantially eliminated, the method comprising pumping the oil-in-water emulsion used as the lubricant/coolant in the shaping of the metal article to a reservoir for the coolant, the coolant being comprised of a dilute emulsion of an oil and a surfactant for the emulsification of the oil. A portion of the coolant being pumped to the reservoir is diverted therefrom and conveyed under pressure to a filtration unit equipped with a semipermeable membrane which is porous to water and the surfactant but impermeable to the oil whereby a permeate comprised of water and the surfactant passes through the membrane while the oil is retained. The oil retentate is circulated back to the reservoir and the permeate is circulated to a means for applying rinse water to the metal article to remove the oil residues therefrom. The effluent from the rinsing operation comprised of the permeate and the oil residue removed from the metal articles is collected and passed to the coolant reservoir to reconstitute the coolant.

By using permeate derived from the coolant for the rinsing of oil contaminated metal articles such as containers and then reconstituting the coolant with the effluent collected from the permeate rinsing of the article, the oil normally lost with the disposal of rinse water effluent is recovered and the water disposal problem associated with such effluent is substantially eliminated. The presence of surfactant in the permeate rinse water provides the additional advantage that the surfactant promotes the removal of the adhered oil from the metal article being rinsed.

DESCRIPTION OF THE DRAWING

The present invention is illustrated in the accompanying drawing which is a schematic drawing of one exemplary form of the invention.

As shown in the drawing, an oil-in-water emulsion used as a lubricant/coolant in metal working processes is pumped from a coolant supply means 10 through line 11 by pump means 12 to a coolant sump or reservoir 13. Coolant reservoir 13 is equipped with line 13A through which coolant is circulated to a working station (not shown) which may be a rolling mill, a grinding machine, polishing machine or, for the purposes of illustrating the invention, a container wall-ironing machine. A portion of the coolant, e.g. about 1 to about 20% by volume of the total coolant being pumped to the reservoir, is diverted to line 14 and the diverted coolant is pumped by pump means 15 through line 15A to filtration unit 16 equipped with a semipermeable membrane 17 adapted to separate high molecular weight oils from aqueous media as by ultrafiltration or reverse osmosis. The diverted coolant portion is pumped under pressure to the "upstream" or feed zone 18 of the membrane 17. The water portion of the coolant containing the surfactant passes through the membrane 17 and the oil solids are retained whereby a concentrated suspension of oil solids is formed in the feed zone 18 of the membrane. This concentrated oil suspension is removed and pumped from the membrane feed zone 18 by means of pump 20 through line 21 to the coolant reservoir 13. The water containing surfactant separated from the coolant and referred to as "permeate" is pumped by pump means 22 from the output side 19 of the filtration unit 16 through line 23 to rinse chamber 24 where it is to be employed in rinsing the walls of wall-ironed container bodies.

In rinse chamber 24, two-piece metal containers 25 which have traces of extraneous metal, coolant oil and other contaminants derived from the wall ironing process, are delivered in an upright, inverted position to chamber 24 by suitable conveyor means such as endless belt 26 and are there transferred to an endless reticulated belt 27.

As the containers 25 travel through the chamber 24 the containers are rinsed with permeate pumped from the output side 19 of the semi-permeable membrane 16 to the spray members 29, 30 mounted in rinse chamber 24, the spray members being provided with a plurality of nozzles 31, 31a which are disposed under the belt 27 and above the containers and which are effective to direct an atomized spray of permeate on the container bodies.

Associated with the water spray members 29, 30 is collection tank 36 in which the rinse water effluent which drains off the permeate rinsed container walls is collected. The drained water effluent contains a small amount of oil residue solids and metal fines from the wall ironing process. The effluent collected in tank 36 is pumped by means of pump 32 through line 33 to a mechanical filter 34 such as a fine wire mesh screen or tube which is capable of removing the metal fines and other solid particulate matter from the effluent. The mechanically filtered effluent is then returned via line 35 to the coolant reservoir 13 to reconstitute the stored coolant material for circulation to the wall ironing equipment.

The containers 25 having been rinsed free of oil residues are passed from the rinse chamber 24 to a washing zone (not shown) to remove any traces of permeate containing surfactant which may adhere to the container bodies. Effluent wash water from the wash zone containing minute traces of surfactant can be safely disposed of in community sewage systems without ecological effect. After passing through the wash zone the container bodies are chemically treated to prepare the containers for the application of protective coatings and enamels preparatory to filling the containers with beverage product.

The diversion of about 1 to about 20% of the coolant supply to the semipermeable membrane filtration unit 16 for removal of permeate therefrom accompanied by the continuous recirculation to the coolant reservoir 13 of concentrated oil solids from the feed zone 18 of the semipermeable membrane 17 and rinse effluent from collection tank 36 provides a closed system for the water used to rinse oil residues from the container products of the wall ironing process. The closed rinsing system of the present invention substantially eliminates the effluent rinse water waste disposal problem and permits the recovery and reuse of coolant materials which would otherwise be disposed of as waste material.

The diversion of small portions of the coolant contained in the oil reservoir 13 to the semipermeable membrane filtration unit 16 for the generation of rinse water permeate and the continuous recirculation to the oil reservoir 13 of the solids concentrate from the membrane filtration unit 16 and rinse water effluent from the collection tank 36 does not cause any noticeable diminution of coolant physical properties.

PREFERRED EMBODIMENTS

The oil-in-water emulsion which is generally referred to in the present specification as a coolant serves the dual functions of both lubricant and coolant in metal working operations. Typical lubricant/coolant oil-in-water emulsions used in metal working operations are composed essentially of from about 1.0 to 20 percent by weight of an oil, and about 0.1 to about 20 percent by weight based on the weight of the oil of an anionic, cationic and/or nonionic emulsifying agent and the balance substantially water. The term "oil" includes within its meaning natural and synthetic oily materials such as tallow, palm oil, light mineral oil and polyalkylene glycols and ethers and esters thereof. Examples of emulsifying agents include fatty acid soap, alkanol amine soaps, sulfonated organic compounds and phosphonated organic compounds.

For metal shaping operations such as wall ironing, small amounts, e.g. 0.5–10% by weight based on the weight of the oil of lubricity additives such as long chain fatty acids, salts or esters thereof e.g., alkanolamine soaps or esters such as butyl stearates which serve as extreme pressure agents and a bactericides are also incorporated in the oil-in-water emulsion.

The composition of the oil-in-water emulsion itself forms no part of the present invention. The method of the present invention is useable with substantially all of the commonly known and used commercially available oil-in-water emulsions used as lubricant/coolants in metal working operations.

The semipermeable membrane used in the ultrafiltration or reverse osmosis filtration unit may be any commercially available membrane material, such as cellulose, cellulose acetate, polyamides and polysulfone. Semipermeable membranes useful for reverse osmosis and ultrafiltration separations are more fully discussed in U.S. Pat. Nos. 3,528,901 and 3,749,657, the disclosure which is incorporated in the present application by reference.

The maximum pressures at which the coolant is fed to the feed zone of the semipermeable membrane unit is determined by the strength of the filter. The minimum pressure is the pressure required to force the coolant through the semipermeable membrane at a rate sufficient to supply an amount of permeate necessary for the rinsing of the oil residue contaminated article which is delivered to the rinse station from the metal shaping station. In one working embodiment of the invention where 5 gallons/minute of permeate were required for the rinsing of metal containers received in a rinse water station at the rate of 1800 cans/minute from the wall ironing machine of a two-piece can manufacturing line, coolant, comprised of an oil-in-water emulsion containing about 8%–10% by weight oil and about 1% by weight surfactant was continuously pumped at the rate of 70 gallons/minute at a pressure of 450 pounds per square inch into the feed zone of a reverse osmosis unit equipped with a cellulose acetate semipermeable membrane having a salt rejection rating of 50% and a filter area or flux rate with the coolant of 10 gallons/square foot/day (24 hours).

The reverse osmosis filtration unit supplied permeate containing less than 0.1% by weight oil at the rate of 5 gallons/minute to the rinse station and 65 gallons/minute of coolant concentrate containing about 8.5 to 11.0% by weight oil was pumped back to a coolant reservoir unit containing about 3000 gallons of coolant.

In this manner permeate was continuously separated from the coolant and used in the rinsing of two-piece cans. The effluent rinse water containing the oil residue from the cans and surfactant was pumped at the rate of 20 gallons/minute through a fine wire mesh filter to remove metal filings and other solid particulate matter which had been rinsed from the can bodies and retained in the effluent. The filtered effluent was then pumped to the coolant reservoir for reconstitution of the coolant.

By continuously returning to the oil reservoir the solids concentrate from the feed zone of the semipermeable membrane and recirculating the rinse water effluent from the rinse chamber, the solids concentration in the coolant oil stored in the oil reservoir and delivered to the wall ironing machine was found to vary to very minor degree i.e., in the order of less than 0.1%.

What is claimed is:

1. A method for recovering oil residues adhered to metal articles subjected to metal working operations which comprises sequentially providing a quantity of an oil-in-water emulsion used as a coolant in the metal working operation, circulating the oil-in-water emulsion to a reservoir, diverting a minor portion of the oil-in-water emulsion circulated to the reservoir and conveying the diverted portion under pressure to the feed zone of a filtration unit equipped with a semipermeable membrane which is impermeable to the oil and permeable to the water portions of the oil-in-water emulsion, collecting a concentrated suspension of oil solids in the feed zone and circulating the suspension to the reservoir, collecting the water permeate passed through the membrane and circulating the permeate to a rinse station, rinsing the metal article with the permeate at the rinse station, collecting an effluent from the permeate rinsing of the article the effluent containing oil solids rinsed from the article and circulating the effluent to the reservoir whereby the oil residue from the article is intermixed with the coolant and is available for use in the metal working operation.

2. The method of claim 1 wherein the semipermeable membrane is a reverse osmosis membrane.

3. The method of claim 1 wherein the semipermeable membrane is an ultrafiltration membrane.

4. The method of claim 1 wherein the semipermeable membrane is a cellulose acetate based reverse osmosis membrane.

5. The method of claim 1 wherein the semipermeable membrane is a polysulfone based reverse osmosis membrane.

6. The method of claim 1 wherein about 1 to about 20% by volume of the oil-in-water emulsion is diverted to the filtration zone.

7. The method of claim 1 wherein the oil-in-water emulsion contains about 1 to about 20 percent by weight of an oil and about 0.1 to about 20 percent by weight of a surfactant.

* * * * *